Figure 1:
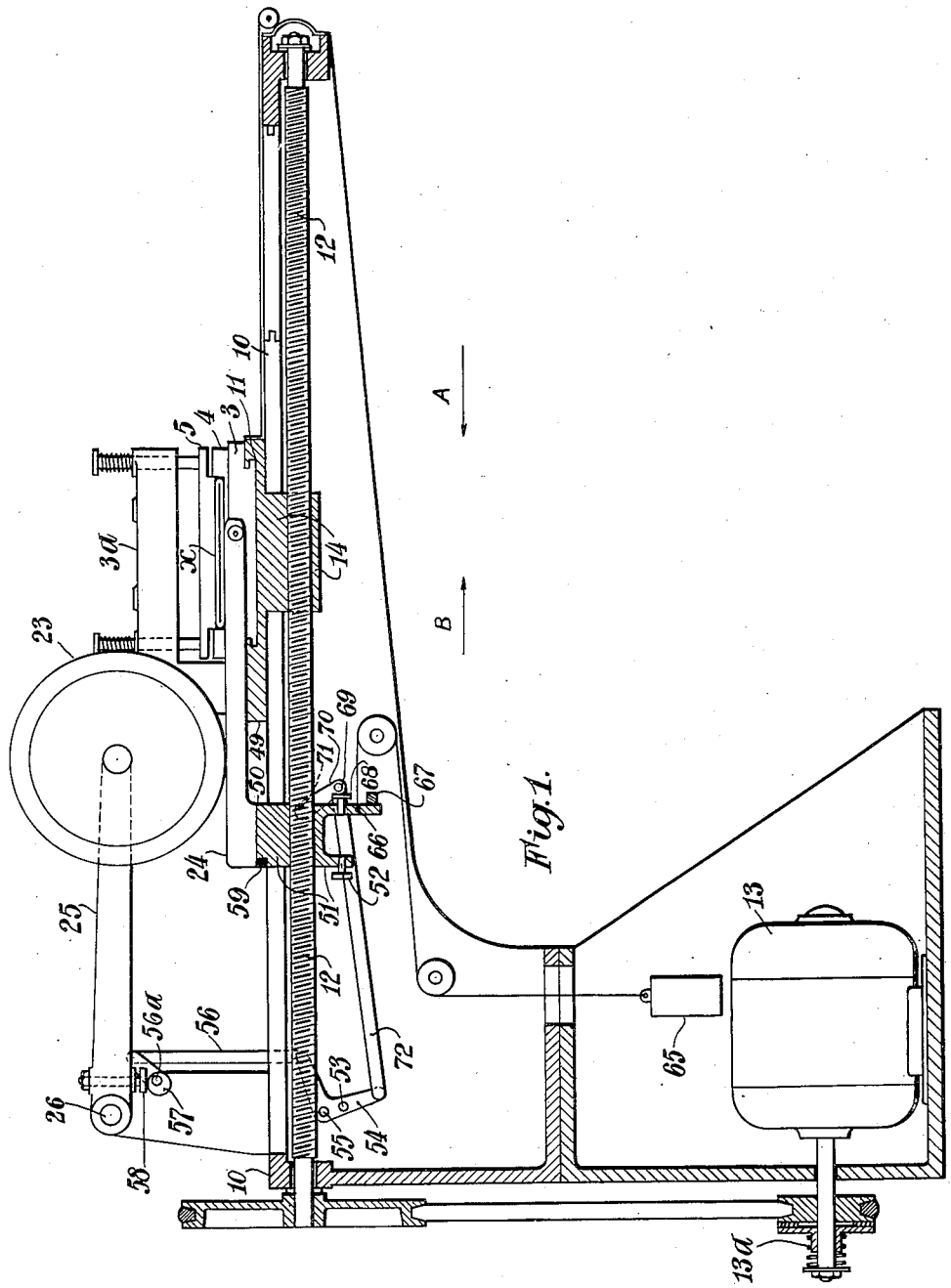

Nov. 13, 1934.  H. WILLSHAW  1,980,564
JOINING RUBBER ARTICLES
Filed Sept. 5, 1934   5 Sheets-Sheet 1

INVENTOR
Harry Willshaw
by Stina & Rauber
his attorneys

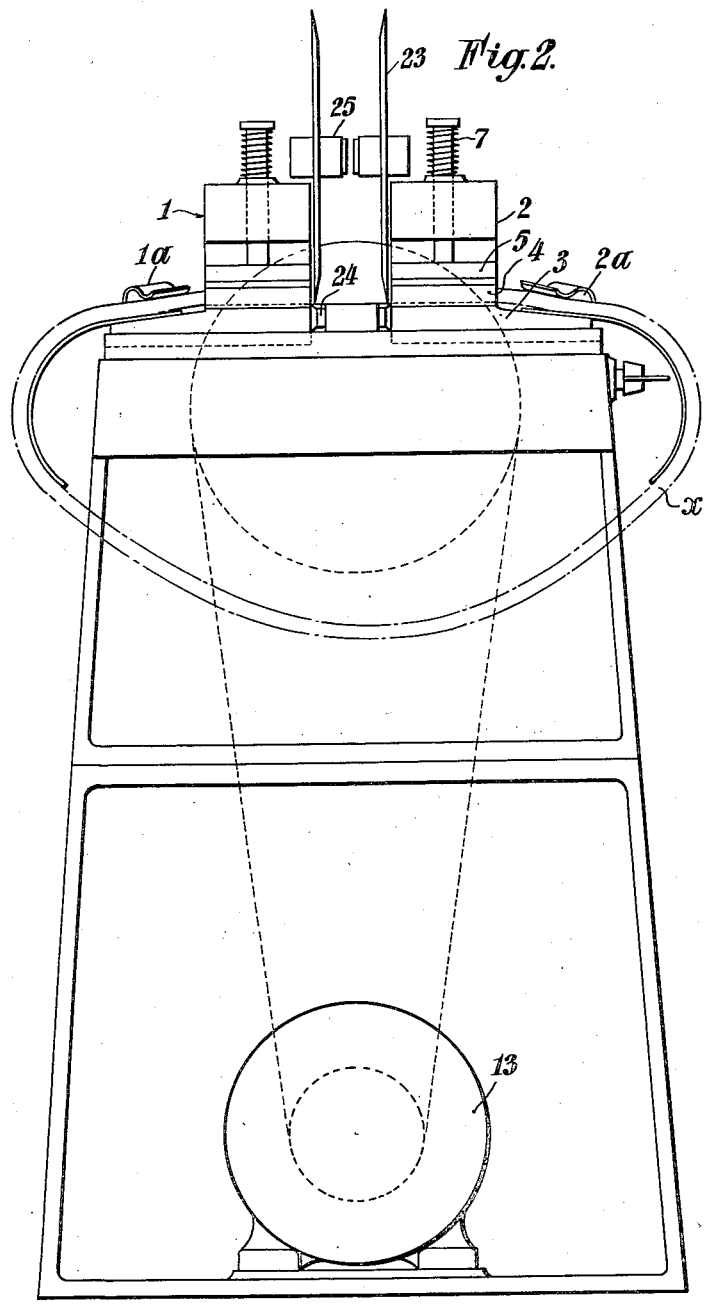

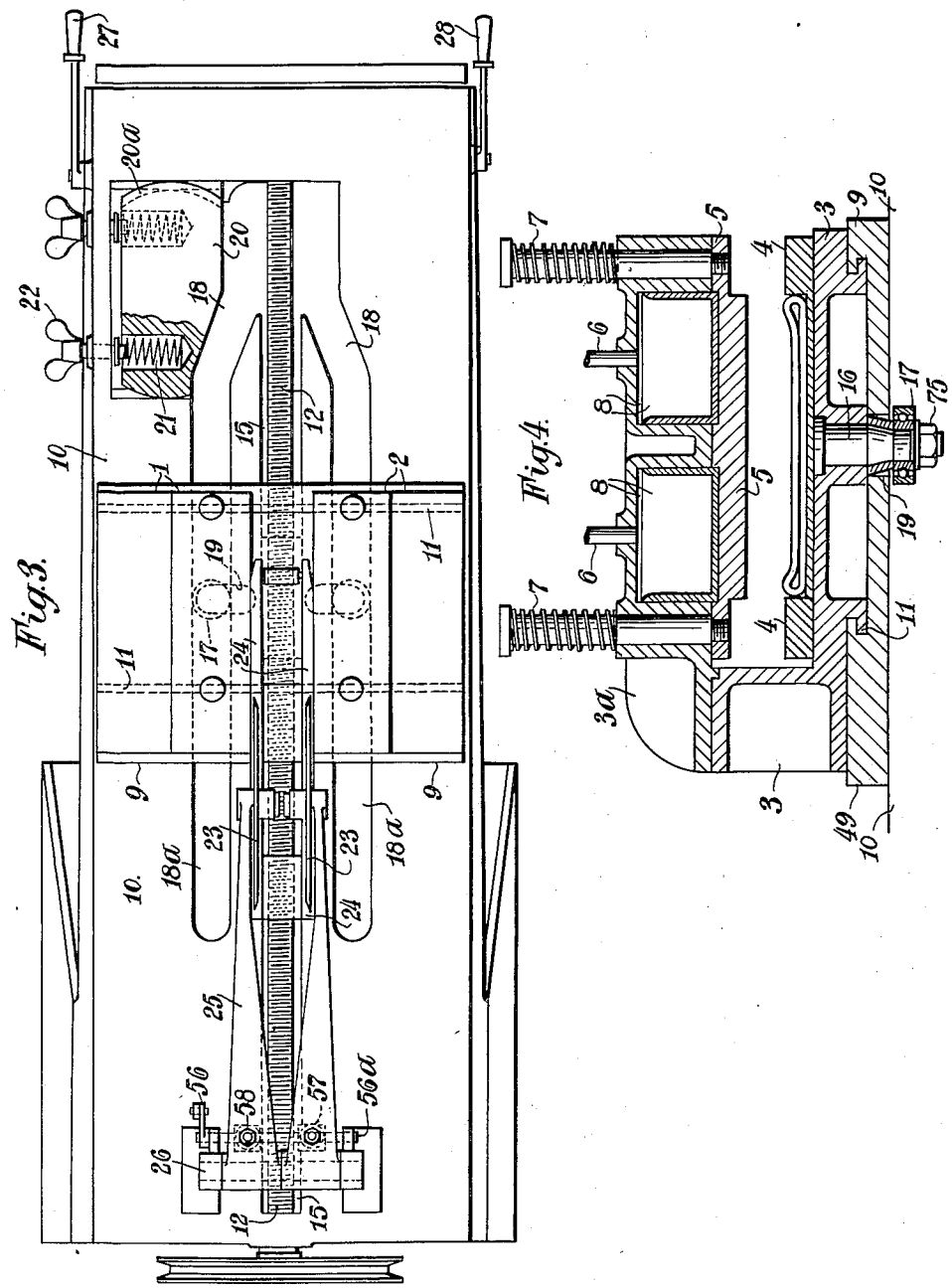

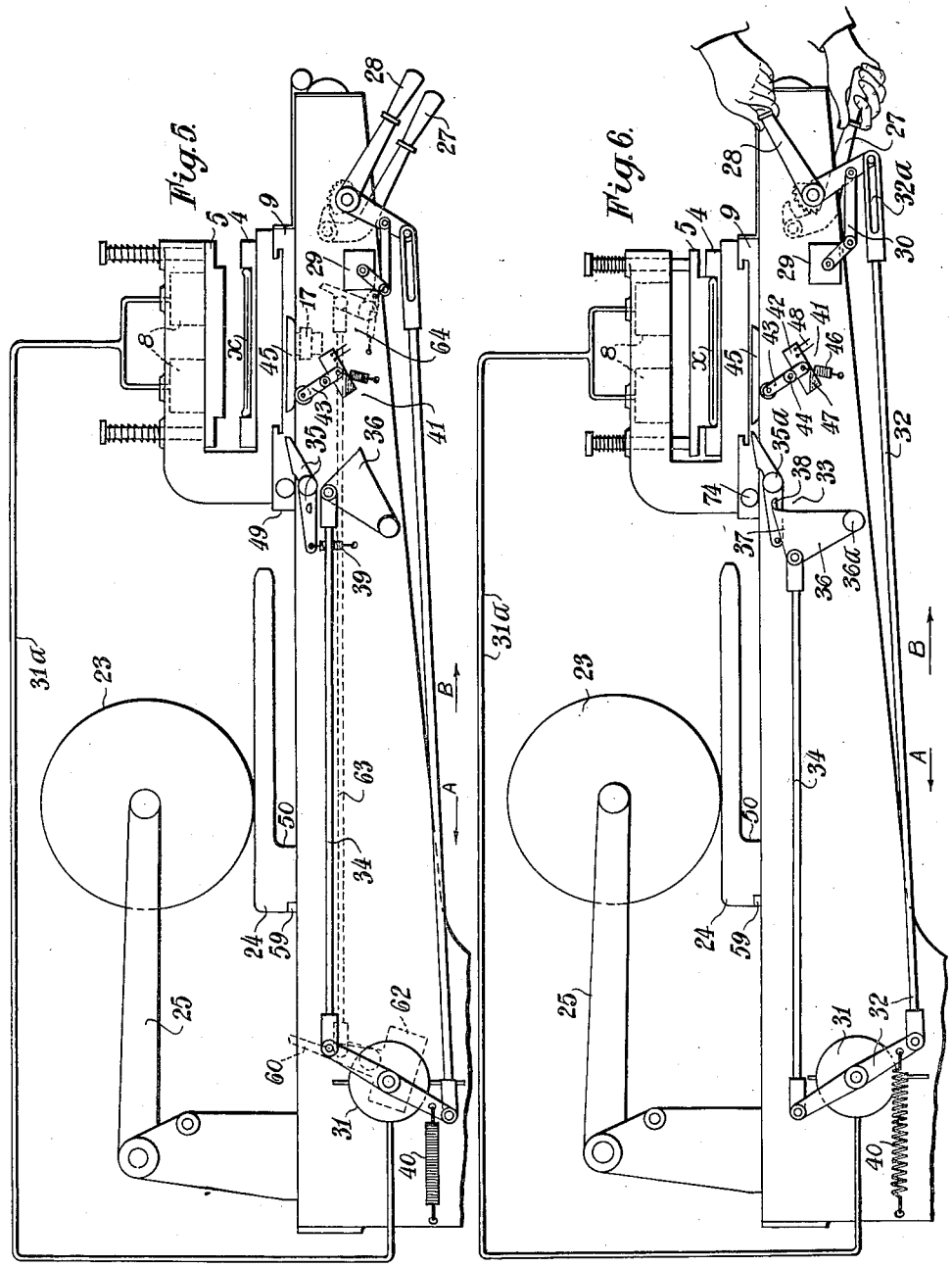

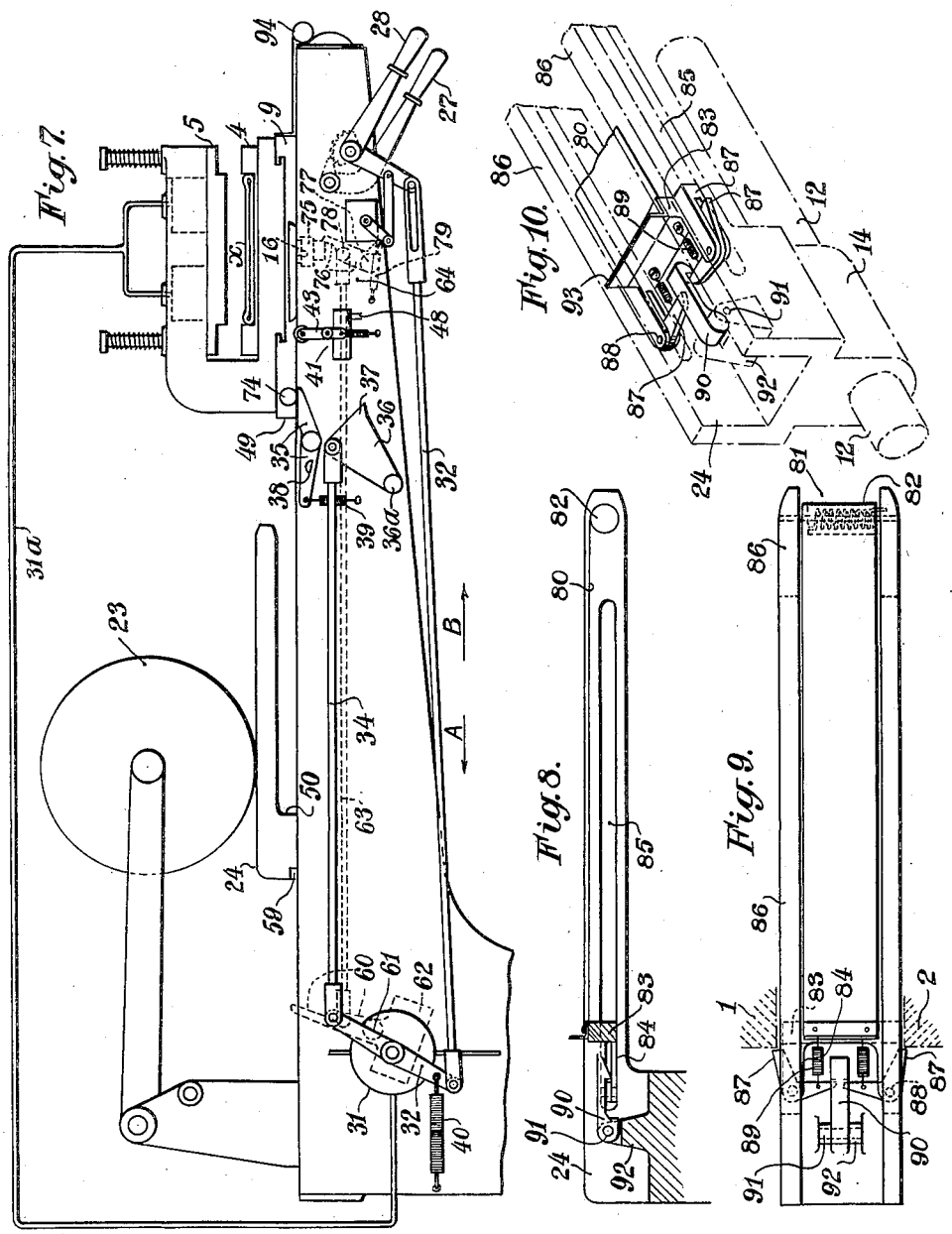

Patented Nov. 13, 1934

1,980,564

UNITED STATES PATENT OFFICE 1,980,564

JOINING RUBBER ARTICLES

Harry Willshaw, Sutton Coldfield, England, assignor to Dunlop Tire and Rubber Corporation, Buffalo, N. Y., a corporation of New York Application September 5, 1934, Serial No. 742,727
In Great Britain August 1, 1933

22 Claims. (Cl. 154—9)

This invention relates to the manufacture of articles of rubber or the like, hereinafter called rubber, and is more especially concerned with the joining together of two or more ends for example to provide an annulus by joining together the two ends of a length: in using the term "length" we also include the plural "lengths".

My invention is particularly applicable in connection with the tire trade in which examples of its usefulness include its application to tire tubes, treads, flaps or protector bands and so on.

It is especially applicable in connection with tire tubes, and in the following we will assume, without intention in any way to limit the scope of the invention, that it is these with which we are dealing.

According to this invention apparatus for use in joining together the ends of a length of rubber or the like and comprising means for clamping said ends, means for cutting said ends and means for butting said ends together is characterized, (a) in that cutting involves relative movement between cutter and clamps effected progressively across the width of said length and/or (b) in that butting involves movement of the clamps along a line lying at an angle to the line they follow in converging and/or separating.

Movement of the clamps relatively to each other, hereinafter called the transverse movement, in converging and/or separating may be produced with the aid of a converging guide or guides with which said clamps, or parts associated therewith, coact. Said guiding means preferably translate the movement of the clamps along a line lying at an angle to the line they follow in converging and/or separating, hereinafter called the longitudinal movement, into the said transverse movement.

Provision may be made whereby the length is cut between two surfaces between which there is relative movement of a rolling kind, and this may be effected by the cutter coacting with a relatively movable anvil or the like, the cutter for example rotating while the anvil moves linearly in relation thereto.

The apparatus is preferably adapted to be operated automatically, the aforesaid longitudinal movement of the clamps being utilized to control or direct the various operating motions of the apparatus, said automatic control for example being effected with the aid of a series of trips or the like spaced at appropriate points in relation to the travel of the clamps, as will hereinafter become apparent.

Various other features and provisions of my invention will become apparent as the description proceeds—for example the fluid pressure operation of the clamps in their clamping section and means for clearing the clamps of the small pieces left by the cutting operation.

In order that my invention may be more easily understood and readily carried into effect it is described with reference to the accompanying drawings, in which:—

Fig. 1 is a part side view of the preferred form of apparatus according to my invention; Fig. 2 is an end view and Figure 3 a plan view of Fig. 1; Fig. 4 is a detail sectional view through the clamps; Figs. 5, 6 and 7 are diagrammatic side views showing different operating positions of the apparatus; Figs. 8 and 9 are detail side and plan views respectively of one of the mechanisms of the apparatus; and Fig. 10 is a part perspective view of Figs. 8 and 9.

In the embodiment of the invention shown in the accompanying drawings a pair of clamps 1 and 2, Figs. 2 and 3, are provided for clamping the ends to be joined. As shown in Figs. 1 and 4, each clamp comprises a base member 3 and a pair of clamp plates 4 and 5, plate 4 being fixed to said base while plate 5 is movable, to and from plate 4, in a fixed extension 3ª projecting over the plate 4.

The clamps are closed by fluid pressure means 6 and opened by springs 7, said means 6 comprising for each clamp a pair of piston and cylinder units 8 connecting with a source of fluid pressure as hereinafter set out.

The clamps are carried by a saddle 9, being slidable thereon transversely of the bed or base plate 10 of the apparatus, a tongue and groove guide 11 being formed between said saddle and the clamp bases 3, see particularly Fig. 4.

The saddle is movable to and fro along, i. e., longitudinally of, the bed plate 10, said saddle moving in one direction to bring the clamps into coaction with the cutter and in the opposite direction to bring the clamps together to butt the cut ends.

Said movement of the saddle is effected by a screw 12 which is driven by a motor 13 and adapted to engage a nut part 14 carried by said saddle. The outside of said nut part coacts with a slot 15 in the bed plate 10 so as to keep said saddle in correct alignment on the bed plate. 13ª is a clutch on the motor shaft adapted to slip in case of emergency e. g., jamming of the operating parts.

The means for butting the tube ends, i. e., bringing the clamps together on the saddle, comprises a stud 16 dependent from the clamp bases 3 and carrying a roller 17 adapted to coact with converging slots or cam guides 18 in the bed plate 10. Said spigots pass through the saddle 9 which is slotted as shown at 19 to accommodate the transverse travel of the clamps on the saddle. Said slots 18 are extended as shown at 18ª in Fig. 3 to accommodate the travel of the clamps with the saddle for cutting purposes.

The converging slots or guides 18 may be resiliently loaded to provide the requisite "nip" for the butting effect—for example one side of one of the slots may comprise a plate 20 backed up by springs 21 adjustable by wing nuts 22 to vary the pressure: said plate may have curved edges 20ᵃ to accommodate its movement as the roller 17 passes by.

The cutting means in the preferred form comprises a pair of disc knives 23, one for each end of the tube, said knives rotating as the tube ends in the clamps move past them.

These knives have cutting coaction with an anvil 24 which supports the tube ends while they are being cut.

Said anvil is relatively movable for two main purposes viz, (a) there is relative movement between knives and anvil so that the cutting coacting between the two is of a purely rolling kind without slip, and (b) there is relative movement between anvil and clamps so that said anvil is in position between the clamps during cutting, but is clear of them during butting—to allow them to come together for the latter purpose.

The knives 23 may be spring loaded or weighted to assist cutting and they are preferably heated as by an electrical resistance—in the form illustrated, they are rotatably mounted each on a lever 25 pivoted at 26, the weight of the knives and the levers giving sufficient cutting pressure.

The apparatus is adapted to be operated automatically and in the preferred form it operates as follows:—

It is assumed that the tube $x$ has been placed by hand in position in the apparatus with its ends held lightly between the clamps by spring clips 1ᵃ and 2ᵃ, Fig. 2; to start the apparatus the handles 27 and 28, which are on opposite sides of the apparatus as shown in Fig. 3, are pulled up from the position shown in Fig. 5, which shows the apparatus in the starting position, to that shown in Fig. 6. The handle 27 is simply a safety device to ensure that both hands of the operator are occupied at this time. The handle 28 is the actual starting handle and pulling it up as described does three things; (a) it operates a switch 29 via linkage 30 to start the motor 13, (b) it operates a fluid pressure valve 31 via linkage 32 to close the clamps so as to grip the tube ends firmly therein, said valve connecting with the fluid pressure units 8 by means of piping 31ᵃ, and (c) it sets a trip 33 via linkage 34 into the position shown in Fig. 6.

Said trip comprises a pair of levers 35 and 36 pivoted at 35ᵃ and 36ᵃ respectively, the lever 36 having a tip 37 adapted to engage a projecting pin 38 on the lever 35. Said lever 35 is independently spring loaded at 39, Fig. 7, while the lever 36 is loaded by a spring 40 common to the linkage 32—34.

Starting of the motor by the switch 29 causes the screw 12 to rotate and so progress the saddle 9, carrying the clamps, in the direction of the arrow A in the drawings—the handles 27 and 28 being still held up by the operator as shown in Fig. 6. After a short time said movement operates a further switch 41 which keeps the motor running in place of the switch 29, so that the operator is free to release said handles which drop back into their original position, the slot 32ᵃ in the linkage 32 accommodating said drop, and this repositions switch 29 in the "off" or start position.

Said switch 41 comprises a mercury-containing tube 42 carried on a lever 43 adapted to be pivoted about a point 44 by a skid-like cam 45 carried by the saddle 9, said lever 43 being spring loaded at 46 normally to be "on", i. e., the spring 46 tends to put the tube 42 into the position shown in Fig. 7, in which position the mercury 47 in closing the contacts 48 make the circuit to keep the motor 13 running.

The tilting of the switch to the "on" position by the movement of the saddle as described above is effected by the cam 45 moving, in the direction of the arrow A, free of the lever 43—said cam having moved into engagement with said lever, to put the switch into the position shown in Figs. 5 and 6, at the end of the previous operation of the apparatus as hereinafter set out.

The saddle, carrying the clamps with the tube ends gripped firmly therein, then moves onwards in the direction of the arrow A: this first causes said ends to move over the anvil 24 on which they are to be cut. The movement of the saddle being continued face 49 of the saddle contacts face 50 of the anvil 24 and pushes said anvil along past the knives, the anvil being supported upon the screw 12, by means of a boss 51, Fig. 1, integral with the anvil and fitting slidably on the screw. The anvil moving past the knives rotates the latter so that anvil and knives make pure rolling contact; and continued movement of the saddle causes the tube ends to move under the knives, said ends being thereby cut off.

Further slight movement of the saddle in the same direction does two things, viz. (a) it causes the knives to be lifted from the anvil so that different parts of said knives are used for the next operation and (b) it reverses the motor 13 to take the saddle back along the bed plate 10.

Effect (a) is produced, see Fig. 1, by a striker 52 carried by the anvil contacting a projecting pin 53 on a lever 54 pivoted at 55, which lever, via linkage 56, rotates a spindle 56ᵃ to rotate a pair of cams 57 which coact with respective stops 58 on the knife levers 25 to lift the knives about the pivot 26.

Effect (b) is produced, see Fig. 7, by a projection 59 on the anvil contacting a lever 60 and rocking said lever about its pivot 61 to tilt a mercury switch 62 which said lever carries. In addition to reversing the motor, this coaction of projection 59 and lever 60 also, via a link 63, sets a trip 64 operating as hereinafter set out.

Reversal of the motor reverses the direction of rotation of the screw 12 and thus the saddle, carrying the clamps and the cut tube, begins to move backward—in the direction of the arrow B. The anvil follows said saddle, under the influence of a weight 65 attached to said anvil at 66, until said anvil contacts a fixed stop 67 when said saddle moves away from the anvil; just prior to that a striker 68 carried by said anvil contacts a projection 69 on a lever 70 pivoted at 71, and this, via the link 72, lowers the knives 23 onto the anvil again by a reversal of the movement of the cam and link system 54—58.

Continued movement of the saddle in the direction of the arrow B carries it clear of the anvil as shown in Fig. 7 so that butting of the two cut ends of the tube can take place. This is done, as already indicated, by the rollers 17 travelling along the converging slots 18, said travel causing the clamps, which are fixed to said rollers, to move toward each other on the saddle, this movement being accommodated by the slots 19. As already indicated one side of one of the slots 17 is formed by a spring-loaded plate 20 and one of the rollers bears against this, the effect being to impart to the clamps during the butting operation a desirable resilience.

The saddle continues for a short distance in the direction of arrow B and this additional movement does two things, viz. (a) it operates the fluid pressure valve to open the clamps, and (b) it again reverses the motor.

Effect (a) is produced by release of the trip 33, a pin 74 carried by said saddle rocking the lever 35 to move the pin 38 on said lever away from the lip 37 of the lever 36: this allows the spring 40 to pull the levers 32 over into the position shown in Fig. 7 and this operates the fluid pressure valve 31 to relieve pressure from the piston and cylinder units 8.

Effect (b) is produced, see Fig. 7, by a projection 75 of one of the studs 16 coacting with the trip 64 aforesaid, said projection engaging a lever 76 and rocking it about its pivot 77; said lever connects at 78 with the link 63, the result being to tilt the mercury switch 62 and so reverse the motor: the lever 76 is spring loaded at 79 to keep this trip mechanism definitely in one position or the other.

The saddle then moves forward again in the direction of the arrow A: this movement proceeds for a short time only (from the position shown in Fig. 7 to that shown in Fig. 5) when the cam 45 engages the lever 43 of the switch 41 and tilts the mercury tube 42 thereof into the position shown in Fig. 5 so as to stop the motor 13 altogether.

This further movement of the saddle causes the clamps to open laterally under the guidance of the slots 18, said clamps having previously opened vertically to free the tube, and the joined tube is then removed and the operations above described are repeated ad lib.

It is not to be assumed that I am limited to the foregoing or to any one particular embodiment of my invention as the same may be embodied in a variety of forms without departing from the spirit thereof.

For example instead of the cutters operating as described, we may rotate them independently: or instead of using disc cutters, we may use other cutting means such as wires or straight or substantially straight blades.

And instead of two cutters, one for each end of the tube, we may use only one when the two ends of the tube may be overlapped and severed together with a single cut.

And instead of operating the apparatus or controlling its various motions electrically we may use for instance a mechanical system incorporating a suitable clutch or clutches and mechanical trips: or we may use a suitable fluid pressure control system: or of course we may use a system combining any or all electrical fluid pressure, or mechanical means.

And we may make various modifications and provide various refinements of the preferred or other forms of the apparatus—for example the preferred form may be provided with means for getting rid of the small pieces cut from the tube ends.

In one form said means comprises a shutter or blind 80 of a spring actuated roll shade type, disposed in a bifurcation 81 of the anvil 24 said blind being fixed at one end to a spring-loaded roller 82 carried across the free end of said bifurcation and at the other end to a bracket 83 having wings 84 whereby it is slidably aligned in slots 85 formed in the sides of the legs 86 of the anvil 24. This bracket also carries a pair of levers 87 which are, (a) pivoted at 88 on the wings 84, (b) spring loaded at 89, and (c) adapted to coact with a catch 90 pivoted at 91 on a boss 92 fixed to the anvil 24: the operation is as follows:

The springs 89 normally keep the levers 87 projecting through the slots 85 as shown in Figs. 9 and 10: as the clamps move along the anvil they contact said levers and so push the bracket 83 along said anvil, thus extending the blind 80, said anvil meantime remaining stationary by means of the weight 65. This movement of the clamps along the anvil finally causes the levers 87 to engage the catch 90 as shown already in Fig. 10.

Then surface 49 of saddle 9 contacts face 50 of anvil 24 and pushes the latter under the knives, the whole unit comprising anvil, blind, levers and catch and also saddle and clamps moving bodily, and this conditions holds until, in the return journey, the anvil is stopped by the stop 67 and the saddle and clamps begin to move away from it.

Then the catch 90 is stationary—with the stationary anvil—and the bracket 83 is tending to move forward under the influence of the spring roller 82. This causes the levers 87, which are still engaged by the catch 90, to be pivoted by said catch so as to pull their projecting ends inwardly and clear of the clamps.

The spring roller 82 then pulls the bracket 83 swiftly along the anvil with the result that the two pieces cut off the tube ends are flicked forward, assisted perhaps by the projection 93 on the bracket 83, and out to the front of apparatus where they can be readily removed by hand: another roller blind 94 may be provided to catch them if desired said blind rolling and unrolling as the clamps move to and fro along the bed plate 10.

The operation of the apparatus is as follows:

Starting with the apparatus in the position shown in Fig. 5, the operator takes the ends to be joined as, for example, the two ends of an inner tube, and places them in the spring clamps 1ᵃ and 2ᵃ (Fig. 2) so that the ends will project somewhat beyond the opposite edges of the clamps 5. Then the operator lifts the handle 27 with one hand, thereby releasing the handle 28 which is thereupon lifted to the position shown in Fig. 6. The movement of the handle 28 draws the links 30 and 32 to the left and thereby closes the switch 29, starts the motor 13 and opens the valve 31 to admit air through the branch pipe 31ᵃ to the chambers 8 to lower and clamp the clamps 5. This clamping of the clamps 5 thereupon takes place immediately with the starting of the motor. As soon as the motor 13 starts it rotates the screw 12 (Fig. 1) which extends through an internally threaded opening in the downward projection 14 of the saddle 9 so that as the motor rotates it draws the saddle 9 and the clamps and other mechanism associated with it to the left of Fig. 1, or in the direction of the arrow "A".

During the initial movement of the saddle 9 the skid cam 45 acting on the lever 43 holds the mercury switch 42 in open position, but as soon as the cam 45 passes sufficiently to the left in Fig. 6 to release the lever 43, the mercury switch swings to the position shown in Fig. 7, thus closing the circuit, by-passing the motor valve 29 and maintaining a circuit through the motor so that upon the release of the handle 28 the motor will still be energized. The valve 31 is also held in its open position after the release of the handle 28 by the link 34 and the lever 36 which is engaged by the latch 38 on a latch lever 35.

As the saddle 9 is carried to the left the ends of the length of material clamped in the clamps 4 and 5 are brought to an anvil 24 and thence into contact with the rotating cutter 23 which severs the projecting parts of the ends. Just before the cutting operation a depending part 51 of the anvil 24 through which the screw 12 freely extends is engaged by the projection 14 of the saddle and carried with the saddle in the direction of the arrow "A", Fig. 1. When the cutting stroke has been completed, the projection 59 on the anvil contacts with the lever 60 pushing it to the left, reversing the mercury switch 62 and thus reverses the motor 13 and thereupon the rotation of the screw 12 is reversed drawing the saddle and its associated elements to the right or in the direction of the arrow "B", Fig. 1.

The cutter 23 is lowered and lifted in the cutting and withdrawing movements of the saddle 9 by means of linkages 56—70 and the pins 53 and 69 and the cam 57, the pin 53 being engaged by a stop 52 to rotate the cam 57 to lifting position when the anvil has moved to the end of its left-hand movement, and the cam being returned to its lower position when a stop 68 engages a pin 69 on the lever 70.

In the movement of the saddle 9 below the cutters 23, the clamps 1 and 2 and their base plates 4 and 5 are moved in parallel positions by means of the parallel guides 18ª into which project the studs 16, 17 respectively of the clamp base plates 5 and 4. However, as the saddle moves to the end of movement B, the guides 18ª converge as at 18 sufficiently to cause the clamps 1 and 2 to move toward each other and bring the cut ends into abutment. Resilient pressure is obtained at this point by means of the spring pressed guide section 20.

When the saddle reaches the limit of its right-hand or "B" movement, the stud 75 engages the lever 76, as shown in Fig. 7, and through the link 63 returns the mercury switch 62 to its original position and thus drives the motor 13 in the forward direction. The screw 12 then starts the saddle 9 in the left or "A" direction and it continues in this direction until it reaches its starting point whereupon the cam 45 engages the lever 43 tilting the mercury switch 41 and interrupting the by-pass circuit. The apparatus then remains stationary until the lever 28 is again moved to operative position.

As the clamps 1 and 2 move in the "A" direction they engage the trips 87 of the mechanism for removing the cut ends and push these trips together with the roll strip 80 to receive the cut ends. The end of the strip 80 is then held in engagement by the latch 90 on the anvil. As the anvil is stopped by the stop 67 and the saddle moves away from it, the levers 83 swing in against the action of the springs 89 until they are free from the latch 90 whereupon the strip 80 is snapped back to its original position throwing the cut ends out of the apparatus.

What I claim is:—

1. Apparatus for joining the ends of lengths of rubber which comprises a cutting means having a rolling cutting edge, means for clamping said ends to be joined, means for moving said clamping means relatively to said cutters transversely to said lengths into progressive engagement by said cutters to cut the ends of said lengths transversely from one side to the other and means for moving said clamping means transversely away from said cutting means and axially to the lengths toward each other to bring said ends into abutment.

2. Apparatus for joining the ends of lengths of rubber which comprises a cutting means, means for clamping said ends to be joined, means for moving said clamping means transversely to said lengths into engagement by said cutters to cut the ends of said lengths transversely and means for moving said clamping means transversely away from said cutting means and guide means to bring said clamping means together during said last movement.

3. Apparatus for joining the ends of lengths of material which comprises means for clamping said ends, cutting means, means for moving said clamping means to bring said ends transversely across and reversely away from said cutting means to cut said opposed ends in parallel transverse cuts and converging guides for said clamping means to bring said cut ends into abutment on said reverse movement.

4. Apparatus for butt-joining the ends of material which comprises a cutting means to form a pair of transverse cuts at said respective ends, means for clamping said material near said ends, transverse guide means for said clamping means having parallel paths at said cutting means and converging at a distance therefrom and means for moving said clamping means in said guide.

5. Apparatus for butt-joining the ends of material which comprises a cutting means to form a pair of transverse cuts at said respective ends, a movable anvil and a cutting edge rolling thereon, means for clamping said material near said ends, transverse guide means for said clamping means having parallel paths at said cutting means and converging at a distance therefrom and means for moving said clamping means in said guide.

6. Apparatus for butt-joining the ends of material which comprises a cutting means to form a pair of transverse cuts at said respective ends, means for clamping said material near said ends, transverse guide means for said clamping means having parallel paths at said cutting means and converging at a distance therefrom and means for moving said clamping means in said guide, said cutting means comprising a fixed rotatable cutter and an anvil movable with said clamping means beneath said cutter.

7. Apparatus for butt-joining the ends of material which comprises a cutting means to form a pair of transverse cuts at said respective ends, means for clamping said material near said ends, transverse guide means for said clamping means having parallel paths at said cutting means and converging at a distance therefrom and means for moving said clamping means in said guide, said cutting means comprising a fixed rotatable cutter and an anvil movable with said clamping means beneath said cutter, and means to limit movement of said anvil to said parallel paths of said guides.

8. Apparatus for butt-joining the ends of material which comprises a cutting means to form a pair of transverse cuts at said respective ends, means for clamping said material near said ends, transverse guide means for said clamping means having parallel paths at said cutting means and converging at a distance therefrom and means for moving said clamping means in said guide, said cutting means comprising a pair of cutter discs, an anvil movable with said clamping means beneath said discs and means to press said discs against said anvil.

9. Apparatus for butt-joining the ends of material which comprises a cutting means to form a pair of transverse cuts at said respective ends, means for clamping said material near said ends, transverse guide means for said clamping means having parallel paths at said cutting means and converging at a distance therefrom and means for moving said clamping means in said guide, said means comprising mechanism for automatically reversing the movement of said clamping means at the end of the cutting movement.

10. Apparatus for butt-joining the ends of material which comprises a cutting means to form a pair of transverse cuts at said respective ends, means for clamping said material near said ends, transverse guide means for said clamping means having parallel paths at said cutting means and converging at a distance therefrom and means for moving said clamping means in said guide, said means comprising mechanism for automatically reversing the movement of said clamping means at the end of the cutting movement and for automatically releasing said clamping means at the end of said reverse movement.

11. Apparatus for butt-joining the ends of material which comprises a cutting means to form a pair of transverse cuts at said respective ends, means for clamping said material near said ends, transverse guide means for said clamping means having parallel paths at said cutting means and converging at a distance therefrom and means for moving said clamping means in said guide, said means comprising mechanism for automatically reversing the movement of said clamping means at the end of the cutting movement and for automatically releasing said clamping means at the end of said reverse movement, returning said clamps to starting position and stopping said clamps.

12. Apparatus for joining the ends of lengths of rubber which comprises a cutting means, means for clamping said ends to be joined, means for moving said clamping means transversely to said lengths into engagement by said cutters to cut the ends of said lengths transversely and means for moving said clamping means transversely away from said cutting means and axially of the lengths toward each other to bring said ends into abutment, and means for removing the cuttings.

13. Apparatus for joining the ends of lengths of rubber which comprises a cutting means, means for clamping said ends to be joined, means for moving said clamping means transversely to said lengths into engagement by said cutters to cut the ends of said lengths transversely and means for moving said clamping means transversely away from said cutting means and axially of the lengths toward each other to bring said ends into abutment, and means for removing the cuttings, said means comprising a spring controlled movable receiving sheet and a releasable latch.

14. Apparatus for joining the ends of lengths of material which comprises cutters to cut said material at said ends in parallel transverse cuts, a base plate, a saddle movable on said base plate toward and from said cutters and having slots transverse to its path of travel, said base plate having guide slots in the direction of movement of said saddle parallel to each other near said cutters and converging at a distance therefrom and clamping means for said ends slidable in said base plate and saddle slots whereby said clamps are moved in one direction in fixed spaced relation past said cutters and are moved toward each other when moved transversely in the opposite direction.

15. Apparatus for joining the ends of lengths of material which comprises cutters to cut said material at said ends in parallel transverse cuts, a base plate, a saddle movable on said base plate toward and from said cutters and having slots transverse to its path of travel, said base plate having guide slots in the direction of movement of said saddle parallel to each other near said cutters and converging at a distance therefrom and clamping means for said ends slidable in said base plate and saddle slots whereby said clamps are moved in one direction in fixed spaced relation past said cutters and are moved toward each other when moved transversely in the opposite direction, and means to move said clamps transversely to cutting position and automatically back to starting position.

16. Apparatus for joining the ends of lengths of material which comprises cutters to cut said material at said ends in parallel transverse cuts, a base plate, a saddle movable on said base plate toward and from said cutters and having slots transverse to its path of travel, said base plate having guide slots in the direction of movement of said saddle parallel to each other near said cutters and converging at a distance therefrom and clamping means for said ends slidable in said base plate and saddle slots whereby said clamps are moved in one direction in fixed spaced relation past said cutters and are moved toward each other when moved transversely in the opposite direction, and means to move said clamps transversely to cutting position and automatically back to starting position and to stop automatically in starting position.

17. Apparatus for joining the ends of lengths of material which comprises cutters to cut said material at said ends in parallel transverse cuts, a base plate, a saddle movable on said base plate toward and from said cutters and having slots transverse to its path of travel, said base plate having guide slots in the direction of movement of said saddle parallel to each other near said cutters and converging at a distance therefrom, said guide slots having resiliently pressed sides at said converging portion.

18. The apparatus of claim 14, having means to move said clamps transversely to cutting position and trip means actuated by the movement of said clamps to return said clamps automatically to the starting position.

19. The apparatus of claim 14, having means to move the clamps transversely of the lengths of said interior to said cutting position relative to said cutters and automatically back to starting position and means to release said clamps at a predetermined point in their return movement.

20. The apparatus of claim 15, and having a trip means, a pivotal lever, and a mercury switch mounted thereon, controlling said moving means and normally in "on" position and tilted to "off" position at the end of operating movement of said clamp.

21. The apparatus of claim 15, having trip means actuated by movement of said saddle and switches operable by said trip means to actuate said moving and automatic return mechanism and to stop said saddle at the original starting point.

22. The apparatus of claim 1 also having an anvil engaged by said clamping means and movable therewith beneath the cutting means.

HARRY WILLSHAW.